United States Patent [19]

Berglund et al.

[11] 4,122,963

[45] Oct. 31, 1978

[54] AUTOMOTIVE GOODS-TRANSPORT VEHICLE

[76] Inventors: Kjell W. Berglund, Revingevagen 4, 240 35 Harlosa; Karl S. Nordlund, Bjarshog, 212 90 Malmo, both of Sweden

[21] Appl. No.: 771,808

[22] Filed: Feb. 24, 1977

[30] Foreign Application Priority Data

Feb. 25, 1976 [SE] Sweden ............................ 7602309

[51] Int. Cl.² ............................................ B60P 1/02
[52] U.S. Cl. .................................. 214/512; 214/501; 280/43.11; 280/43.23
[58] Field of Search ............. 214/512, 514, 505, 506, 214/501; 280/43.11, 43.12, 43.23

[56] References Cited

U.S. PATENT DOCUMENTS

| | | | |
|---|---|---|---|
| 2,774,604 | 12/1956 | Rendel et al. .................. | 214/506 X |
| 3,199,696 | 8/1965 | Chrysler et al. .................. | 214/512 |
| 3,240,008 | 3/1966 | McMullen ........................ | 214/512 X |
| 3,240,506 | 3/1966 | McMullen ........................ | 214/506 X |
| 3,517,944 | 6/1970 | Hage ................................ | 214/512 X |
| 3,633,776 | 1/1972 | Moore .............................. | 214/512 |

*Primary Examiner*—Albert J. Makay
*Attorney, Agent, or Firm*—Bacon & Thomas

[57] ABSTRACT

An automotive goods-transport vehicle has first and second wheeled chassis sections interconnected by a coupling device. A main power unit raises a forward portion of the second chassis section relative to the first chassis section and a pair of remote power units raise wheeled chassis arms of the second chassis section to in turn raise the back portion of second chassis section. The main power unit cooperates with the remote power units such that the latter are operated as slave units to the main power unit to coordinate the movements of all of the power units.

19 Claims, 5 Drawing Figures

AUTOMOTIVE GOODS-TRANSPORT VEHICLE

The present invention relates to an automotive goods-carrying vehicle of the kind comprising first and second wheeled chassis sections interconnected by a coupling device allowing the goods-carrying second chassis section, having its road-wheels carried by swingably mounted chassis-arms, to be raised and lowered relative to the first chassis section by the aid of a lifting gear comprising at least one power unit forming part of the coupling device.

Prior-art coupling devices of the type just described usually comprise elongated lifting members extending longitudinally of the vehicle. As a consequence, a comparatively great portion of the vehicle-length must be taken into account to give room for the coupling device, involving the drawback that the remaining space for goods-carrying purposes will be substantially smaller than for vehicles of identical overall length, but without any inter-section coupling device.

Further, prior-art inter-section coupling devices usually include a base or support which is mounted on the front-end chassis section and which, in part at least, depends beneath the tail-end chassis section which is to be raised and lowered. This involves the drawback that the tail-end chassis section can only be lowered down to said base or support.

The present invention has for its object to eliminate these drawbacks and to provide a simple coupling device which can be housed within a space disposed behind the front-end chassis section and being very short as compared to the overall vehicle length, and which, at the same time, allows the tail-end chassis section, without any obstacle, to be lowered down to ground level. This is enabled substantially by the fact that the coupling device comprises at least one connecting member which extends laterally relative to the longitudinal axis of the vehicle and cooperates, on one hand, with the power unit, and, on the other hand, with a portion of the second chassis section which is freely movable along a side portion of the first chassis section in a manner to enable the power unit through said connecting member to raise and lower the second chassis section without allowing the latter, upon lowering thereof, to abut the first chassis section.

The invention will be described more in detail hereinafter with reference to the accompanying drawings, in which.

Figure 1:
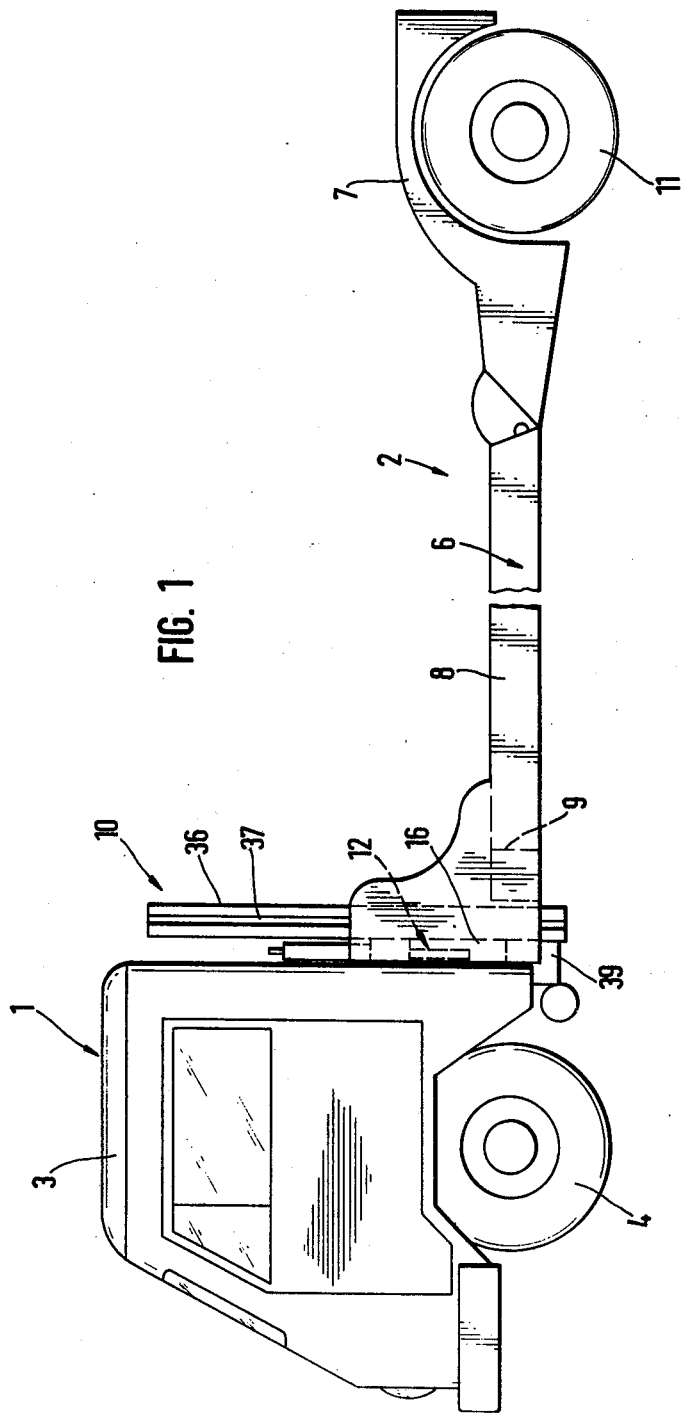
FIG. 1 is a side view diagrammatically illustrating the vehicle incorporating the invention, and with the vertically movable chassis section of the vehicle set in its road-transport position.
Figure 2:
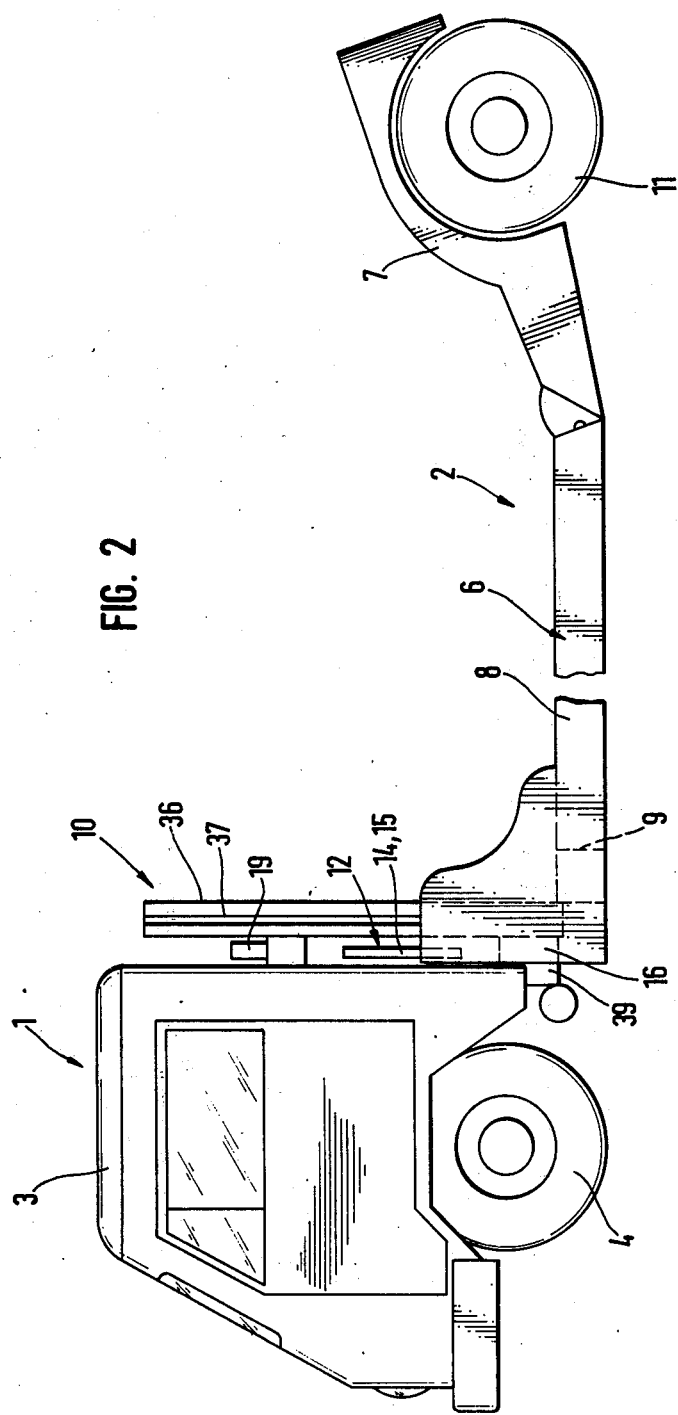
FIG. 2 illustrates the same vehicle, but with its vertically movable chassis section lowered to rest upon the ground surface or floor.
Figure 3:
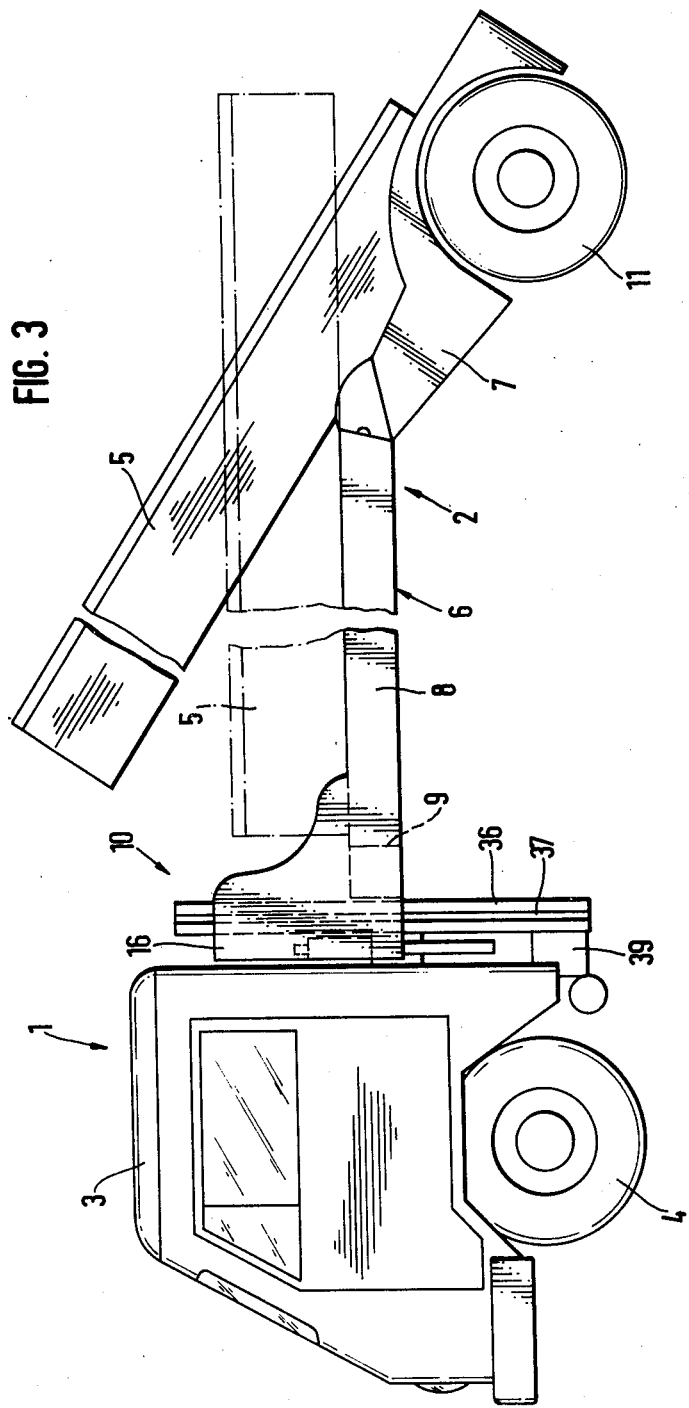
FIG. 3 illustrates the same vehicle, but with its vertically movable chassis section in a position at a higher level than the road-transport position, and with the load shown both in a normal position and in a tipped position.
Figure 4:
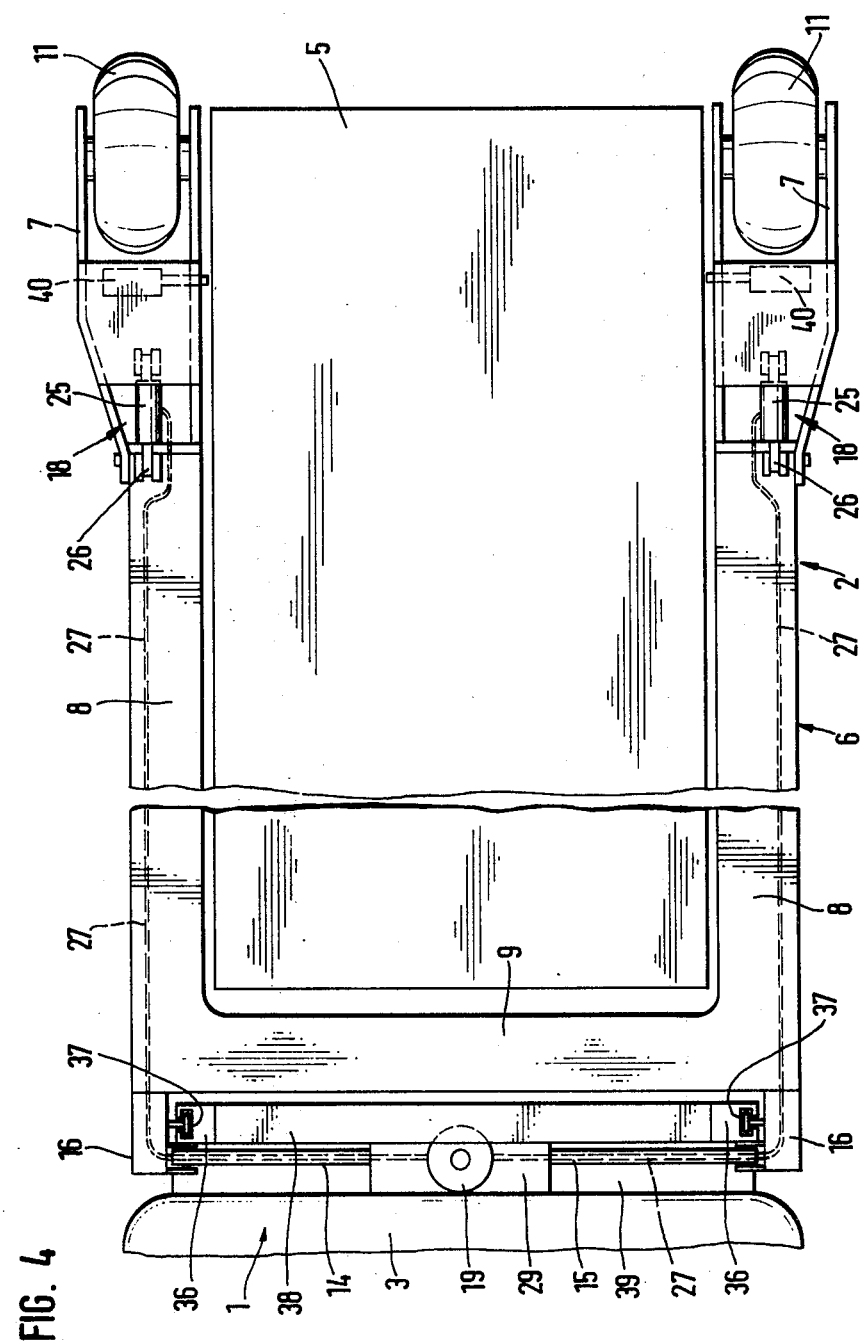
FIG. 4 is a top-plan view of the vehicle.
Figure 5:
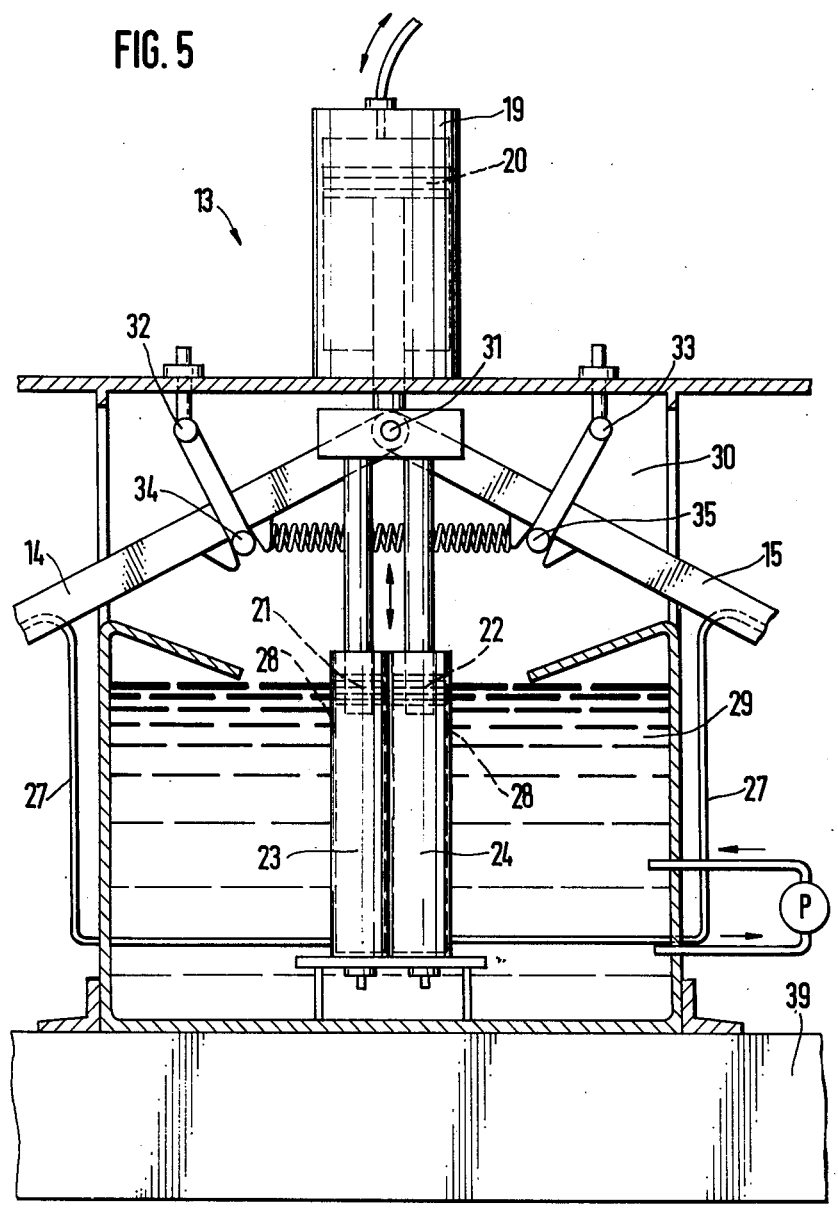
FIG. 5 is a front-view of a coupling and lifting device forming part of the vehicle.

The load-carrying vehicle illustrated on the drawings, in principle, comprises a first wheeled chassis section 1 and a second wheeled chassis section 2. The first wheeled chassis section 1 comprises the propulsion machinery (not shown) of the vehicle, the driver's cabin 3 and the front wheels 4 of the vehicle. The second chassis section 2 is adapted to carry a load 5 (for instance a container, a loadplatform or a cabin) and consists, for instance, of a substantially U-shaped framework 6 which is open at its tail end and includes two parallel lateral frame members 8 inteconnected at their front ends by a cross member 9. The lateral frame members 8 of the framework 6 at their rear ends comprise swingable chassis frame members 7 and the connecting cross member 9. The latter may optionally comprise hook and/or carrier portions (not shown) for engaging the goods 5.

The chassis sections 1, 2 are interconnected by a coupling device 10 which enables the second chassis section 2, the pivoted chassis arms 7 of which mount the rear wheels 11 of the vehicle, to be raised and lowered relative to the first chassis section 1, this raising and lowering movement being executed by the aid of a lifting gear 12 including at least one power unit or actuator 13 forming part of the coupling device 10. Lifting gear 12 is operable, on one hand, to lower the framework 6 until the frame members 8, 9 occupy a bottom position relative to the chassis section 1, and, on the other hand, to raise the framework from this position so as with its hook and/or carrier portions to engage corresponding portions (not shown) of the goods to be transported, for instance the container 5, whereby the goods unit is lifted to a level above its carrying surface. The purpose of the arrangement thus described is to provide an automotive vehicle which can be backed towards a container or other goods unit to be transported until this unit is disposed inside the framework. The latter then can be operated to lift the goods to a transport position to be carried in the same way as in conventional vehicle transports. The goods can again be lowered or lifted up from the transport position, for instance to a level for cooperation with a goods-handling wharf.

In order to utilize efficiently as much as possible of the vehicle length, and, in addition, to enable the second chassis section 2 and/or the goods to be lowered right down to the load-carrying surface, the coupling device 10, in principle, comprises at least one connecting member 14, 15 which extends laterally relative to the longitudinal axis of the vehicle and which cooperates, on one hand, with the power unit 13, and, on the other hand, with such a portion 16 of the second chassis section 2, which portion is freely movable adjacent a side portion 17 of the first chassis section 1, that through the connecting member 14, 15, the power unit 13 can raise and lower the second chassis section 2 without enabling the latter upon lowering thereof to engage the first chassis section 1.

To enable large goods to be lifted and transported, the lifting gear 12 may comprise at least one power unit 18 for operating each chassis arm 7, these power units 18 being operated as slave units in association with the power unit 13 forming part of the coupling device 10 in a manner to coordinate the movements of all the power units 13, 18 associated with the lifting gear 12.

The power unit 13 included in the coupling device 10 comprises a main cylinder 19 having a displaceable main piston 20 with which the connecting member 14, 15 cooperates, the power unit 13 further comprising at least two secondary pistons 21, 22 associated with the main piston 20 and projecting into respective secondary cylinders 23, 24 communicating, at 27, with the cylinder 25 of a slave unit 18 for swinging the chassis arms 7, so that both the connecting member 14, 15 and the pistons 26 of the slave units 18 for operating the chassis arms 7 will be moved positively by the main piston 20. The secondary cylinders 23, 24 and the cylinders 25 of the slave units 18 may form parts of substantially equivolumetrical pressure-fluid system, preferably hydraulic systems.

Each system comprising slave units may communicate with an oil supply 29 through a port 28 which is uncovered when the second chassis section 2 has been lowered onto a supporting surface and lies freely on this surface. Each such port 28 may be formed in a secondary piston 21, 22 so that the port 28 is uncovered to open communication between the oil supply 29 and the secondary cylinder 23, 24 when the secondary piston 21, 22 has reached a predetermined position relative to the secondary cylinder 23, 24, whereas the port 28 is closed so as to interrupt such communication when the secondary piston 21, 22 is displaced from said position further into the secondary cylinder 23, 24.

In this construction, the oil supply 29 can suitably consist of an oil sump enclosing the secondary cylinders 23, 24. The oil sump 29 or a space 30 associated therewith may house pivot linkages 31-35 for the connecting member 14, 15.

In order to provide for a uniform lifting and lowering movement of the second chassis section 2, those portions of the secondary pistons which displace oil in the hydraulic systems comprising the slave units 18, are equal in size and adapted to displace equal volumes of oil in said hydraulic systems.

Each secondary piston 21, 22 may comprise an inner space communicating with the secondary cylinders 23, 24 and containing a pressure fluid, preferably oil, each slave cylinder's 25 space for the same pressure fluid communicating with the secondary piston's space through a top connection on the secondary piston, and a connecting conduit leading to the slave cylinder 25 extending along the connecting member 14, 15 to the second chassis section 2.

The first chassis section 1 includes at least one vertically extending bar or column 36 forming a guide member for the second chassis section 2 when being raised or lowered, said guide column 36 being provided with a guiding groove 37 engaged by the second chassis section 2 through the intermediary of a roller, for example.

The connecting members of the lifting gear 12 are suitably comprised of lifting arms 14, 15. Optionally, each such lifting arm could consist of first and second pivotally interconnected parts, of which a first lifting-arm part cooperating with the power unit 13 has a length such as during the lifting movement to remain entirely inside the outermost side-portions of the vehicle, and of which a second lifting-arm part pivotally connected to the second chassis section 2 is adapted to swing into positions in which it forms an extension of the first lifting-arm part. The second lifting-arm part is suitably in the form of a double-armed lever which is pivotally connected at one side of its fulcrum point with the second chassis section 2 and which has, at the opposite side of said fulcrum point, an abutment adapted to limit the angular movement of the second lifting-arm part and thereby the lifting movement of the second chassis section 2 by abutting the first lifting-arm part, and/or cause angular movement of the second lifting-arm part by impinging an upper abutment member, for instance a reinforcing member 38 extending between two guide members 36.

Each lifting arm 14, 15 is swingable about a fulcrum axis 34, 35 during which movement said lifting-arm part at one side of the fulcrum axis 34, 35 cooperates with the power unit 13, for instance through a roller, and said lifting-arm part at the other side of the fulcrum point cooperates with the other lifting-arm part.

The first chassis section 1 comprises a carrier member 39 extending crosswise relative to the longitudinal axis of the vehicle and carrying, on one hand, the power unit 13 forming part of the coupling device 10, and, on the other hand, at each side thereof, guide members 36 for guiding the second chassis section 2. The guide members 36 are suitably interconnected at their top ends by a cross member 38, and the crosswise extending carrier member 39 includes, on one hand, a hollow cavity constituting a fuel tank for the propulsion of the vehicle, and, on the other hand, a hollow cavity constituting an oil tank for the hydraulic system of the lifting gear 12. The carrier member 39 may form part of a frame structure which is pivotally mounted on the first chassis section 1, in which case the pivot axis is parallel with the longitudinal axis of the vehicle.

The power unit 13 forming part of the coupling device 10 may be provided with equipment for gauging the weight of the goods carried by the second chassis section 2. Further, there may be provided a system (not shown) which is adapted to lock the second chassis section 2 in a transport position and allows the vehicle to be operated at any desired gear-speed when this chassis section 2 is locked in said position.

The power units of the lifting gear 12 are so disposed and designed as to allow parallel displacement of the second chassis section 2 during raising and lowering movements. In addition, each chassis arm 7 may comprise a goods-gripping device 40 adapted to be brought into engagement with the goods 5 carried by the second chassis section 2 to cause the goods 5 to be carried along with the chassis arms 7 when they are being swung and tipped relative to the framework 6.

We claim:

1. An automotive goods-transport vehicle comprising first and second wheeled chassis sections, a coupling device interconnecting said first and second chassis sections, said second chassis section having a forward portion adjacent said first chassis section and a back portion remote therefrom, said coupling device having means for moving said second chassis section relative to said first chassis section, said moving means including a main power means for raising said forward portion of said second chassis section, said coupling device including at least one lifting arm extending between said main power means and said second chassis section, said lifting arm extending laterally relative to the longitudinal axis of the vehicle and including a two-armed lever having pivotal connections on both sides of its fulcrum point, said second chassis section including at least two wheeled chassis arms, said second chassis section including remote power means coupled with said chassis arms, said chassis arms being swingable by said remote power means for raising said back portion of said second chassis section, said main power means cooperating with said remote power means such that said remote power means are operated as slave units to said main power means so as to coordinate the movements of all of said power means.

2. An automotive goods-transport vehicle as claimed in claim 1 wherein said main power means includes a main cylinder having a displaceable main piston with which said lifting arm cooperates, said main power means further including at least two secondary pistons each disposed within a separate secondary cylinder, said secondary pistons being coupled with said main piston, said remote power means including slave cylinders, said secondary cylinders communicating with said slave cylinders for swinging said chassis arms so that both said lifting arm and said remote power means for operating said chassis arms will be moved positively by said main piston.

3. An automotive goods-transport vehicle as claimed in claim 2 wherein said secondary cylinders and said slave cylinders form part of substantially equivolumetrical hydraulic systems.

4. An automotive goods-transport vehicle as claimed in claim 2 including an oil supply communicating with said main power means and wherein said main power means includes a port, said remote power means communicating with said oil supply through said port when said second chassis section has been lowered onto a supporting surface to lie freely thereon.

5. An automotive goods-transport vehicle as claimed in claim 4 including one said port in each of said secondary pistons, said ports being positioned so as to be uncovered to open communication between said oil supply and said secondary cylinders when said secondary pistons have reached predetermined positions relative to said secondary cylinders and so as to be closed to interrupt such communication when said secondary pistons are displaced from said predetermined positions.

6. An automotive goods-transport vehicle as claimed in claim 5 wherein said oil supply consists of an oil sump surrounding said secondary cylinders.

7. An automotive goods-transport vehicle as claimed in claim 6 including an enclosure around at least part of said main power means, said enclosure defining a space, said space housing part of said lifting arm, said lifting arm including pivot linkages within said space, so that oil ejected from said ports can reach said pivot linkages for lubricating the same.

8. An automotive goods-transport vehicle as claimed in claim 2, wherein displacements of said secondary pistons and cylinders are such that each secondary piston and associated secondary cylinder displaces the same quantity of fluid as any other secondary piston and associated secondary cylinder 9. An automotive goods-transport vehicle as claimed in claim 3 including a source of fluid communicating with said main power means and wherein each secondary piston includes an inner space communicating with its respective secondary cylinder, each slave cylinder communicating with the inner space of one secondary piston through a top connection on said one secondary piston and through a connecting conduit leading to such slave cylinder, said connecting conduit extending along the lifting arm to said second chassis section.

10. An automotive goods-transport vehicle as claimed in claim 1 wherein said lifting arm comprises first and second pivotally interconnected lifting-arm parts, said first lifting-arm part cooperating with said main power means and having a length such as to remain entirely inside the outermost side extremities of the vehicle during the lifting movement, said second lifting-arm part being pivotally connected to the second chassis section and being adapted to swing into positions forming an extension of the first lifting-arm part.

11. An automotive goods-transport vehicle as claimed in claim 10 wherein said second lifting-arm part is in the form of a double-armed lever which is pivotally connected at one side of its fulcrum point with said second chassis section and which has, at the opposite side of said fulcrum point, an abutment adapted to limit the angular movement of said second lifting-arm part, to thereby limit the lifting movement of the second chassis section.

12. An automotive goods-transport vehicle as claimed in claim 10 wherein one of said lifting-arm parts swings about a pivot axis, a portion of said one lifting-arm at one side of said pivot axis cooperating with said main power means and another portion of said one lifting-arm part at the other side of said pivot axis cooperating with the other of said lifting-arm parts during said swinging.

13. An automotive goods-transport vehicle as claimed in claim 1 wherein the first chassis section includes a carrier member extending crosswise relative to the longitudinal axis of the vehicle and carrying said main power means, said carrier member having guide members disposed at each side thereof for guiding the movement of said second chassis section relative to said first chassis section.

14. An automotive goods-transport vehicle as claimed in claim 13 wherein said guide members have top and bottom ends, said bottom ends of said guide members joining said carrier member, said guide members being interconnected at their top ends by at least one cross member.

15. An automotive goods-transport vehicle as claimed in claim 13 wherein said moving means includes a hydraulic system and wherein said carrier member includes, on the one hand, a first hollow cavity constituting a fuel tank for the propulsion of the vehicle, and, on the other hand, a second hollow cavity for holding fluid for the hydraulic system of said moving means.

16. An automotive goods-transport vehicle as claimed in claim 1 wherein said second chassis section comprises a frame having a laterally extending member interconnecting two longitudinally extending side-members and wherein said second chassis section includes portions which are disposed outside said laterally extending member, each lifting arm of said coupling device being coupled with one of said outside portions.

17. An automotive goods-transport vehicle as claimed in claim 1 including means for locking said second chassis section in a transport position and for allowing the vehicle to be operated at any desired gear-speed when said second chassis section is locked in said transport position.

18. An automotive goods-transport vehicle as claimed in claim 1 wherein said main and remote power means are so disposed and arranged that said second chassis section remains parallel to said first chassis section during lifting and lowering movements.

19. An automotive goods-transport vehicle comprising first and second wheeled chassis sections, a coupling device interconnecting said first and second chassis sections, said second chassis section having a forward portion adjacent said first chassis section and a back portion remote therefrom, said coupling device having means for moving said second chassis section relative to said first chassis section, said moving means including a main power means for raising said forward portion of said second chassis section, said first chassis section including a carrier member extending crosswise relative to the longitudinal axis of the vehicle and carrying said main power means, said carrier member having guide members disposed at each side thereof for guiding the movement of said second chassis section relative to said first chassis section, said guide members having top and bottom ends, said bottom ends of said guide members joining said carrier member, said guide members being interconnected at their top ends by at least one cross member, said second chassis section including at least two wheeled chassis arms, said second chassis section including remote power means coupled with said chassis arms, said chassis arms being swingable by said remote power means for raising said back portion of said second chassis section, said main power means cooperating with said remote power means such that said remote power means are operated as slave units to said main power means so as to coordinate the movements of all of said power means, said moving means including a hydraulic system and wherein said carrier member includes, on the one hand, a first hollow cavity constituting a fuel tank for the propulsion of the vehicle, and, on the other hand, a second hollow cavity for holding fluid for the hydraulic system of said moving means.

* * * * *